US011921130B2

(12) United States Patent
Unwin et al.

(10) Patent No.: US 11,921,130 B2
(45) Date of Patent: Mar. 5, 2024

(54) SCANNING ELECTROCHEMICAL MICROSCOPY WITH OSCILLATING PROBE TIP

(71) Applicant: University of Warwick, Coventry (GB)

(72) Inventors: Patrick Unwin, Birdingbury (GB); Kim Martin McKelvey, Coventry (GB)

(73) Assignee: The University of Warwick, Coventry (GB)

( * ) Notice: Subject to any disclaimer, the term of this patent is extended or adjusted under 35 U.S.C. 154(b) by 302 days.

(21) Appl. No.: 17/146,288

(22) Filed: Jan. 11, 2021

(65) Prior Publication Data
US 2021/0373047 A1    Dec. 2, 2021

Related U.S. Application Data

(63) Continuation of application No. 15/473,362, filed on Mar. 29, 2017, now abandoned, which is a continuation of application No. 15/069,815, filed on Mar. 14, 2016, now abandoned, which is a continuation of application No. 14/504,357, filed on
(Continued)

(51) Int. Cl.
*G01Q 60/60* (2010.01)
*B22D 19/14* (2006.01)
*C23C 26/02* (2006.01)
*E21C 35/183* (2006.01)

(52) U.S. Cl.
CPC .............. *G01Q 60/60* (2013.01); *B22D 19/14* (2013.01); *C23C 26/02* (2013.01); *E21C 35/183* (2013.01); *E21C 35/1831* (2020.05); *E21C 35/1833* (2020.05); *E21C 35/1835* (2020.05);
(Continued)

(58) Field of Classification Search
CPC .............. E21C 35/183; E21C 35/1831; E21C 35/1833; E21C 35/1835; Y10T 428/12937; Y10T 428/12965; C23C 26/02; B22D 19/14; G01Q 60/60
See application file for complete search history.

(56) References Cited

U.S. PATENT DOCUMENTS 4,969,978 A    11/1990 Tomita et al.
5,202,004 A     4/1993 Kwak et al.
(Continued)

FOREIGN PATENT DOCUMENTS

JP    H04-76840    3/1992
JP    10-132829    5/1998
(Continued)

OTHER PUBLICATIONS

Alpuche-Aviles et al. "Impedance Feedback Control for Scanning Electrochemical Microscopy" Analytical Chemistry, 2001, 73 (20), pp. 4873-4881.
(Continued)

*Primary Examiner* — Sean M Luck
(74) *Attorney, Agent, or Firm* — KOS IP Law LLP

(57) ABSTRACT

A new scanning electrochemical microscopy tip positioning method that allows topography and surface activity to be resolved independently is presented. A SECM tip is oscillated relative to the surface of interest. Changes in the oscillation amplitude, caused by the intermittent contact of the SECM tip with the surface of interest, are used to detect the surface of interest, and as a feedback signal for various types of imaging.

19 Claims, 3 Drawing Sheets

Related U.S. Application Data

Oct. 1, 2014, now abandoned, which is a continuation of application No. 13/641,360, filed as application No. PCT/GB2011/050747 on Apr. 14, 2011, now abandoned.

(52) U.S. Cl.
CPC .................. *Y10T 428/12937* (2015.01); *Y10T 428/12965* (2015.01)

(56) References Cited

U.S. PATENT DOCUMENTS

| | | | |
|---|---|---|---|
| 5,281,814 | A | 1/1994 | Weiss et al. |
| 5,382,336 | A | 1/1995 | Bard et al. |
| 5,412,980 | A | 5/1995 | Elings et al. |
| 5,730,940 | A | 3/1998 | Nakagawa |
| 6,002,131 | A | 12/1999 | Manalis et al. |
| 6,245,204 | B1 | 6/2001 | Lindsay et al. |
| 6,894,272 | B2 | 5/2005 | Kranz et al. |
| 7,156,965 | B1 | 1/2007 | Li et al. |
| 2003/0190425 | A1 | 10/2003 | Lugstein et al. |
| 2008/0121813 | A1* | 5/2008 | Young .................. G01Q 30/06 250/442.11 |
| 2010/0115673 | A1 | 5/2010 | Kranz et al. |
| 2011/0131690 | A1 | 6/2011 | Novak et al. |

FOREIGN PATENT DOCUMENTS

| | | |
|---|---|---|
| JP | 2009-545736 | 12/2009 |
| WO | WO 2006-106818 | 10/2006 |

OTHER PUBLICATIONS

Gonsalves et al. "Scanning Electrochemical Microscopy as a Local Probe of Oxygen Permeability in Cartilage," Biophysical Journal, 2000, 78(3), pp. 1578-1588.

Hengstenberg et al. "Facilitated Tip-Positioning and Applications of Non-Electrode Tips in Scanning Electrochemical Microscopy Using a Shear Force Based Constant-Distance Mode," Chemistry a European Journal, May 2000, vol. 6, No. 9, pp. 1547-1554.

International Search Report on related PCT application (PCT/GB2011/050747) from International Searching Authority (EPO) dated Jul. 27, 2011.

Lee et al. "Combined scanning electrochemical/optical microscopy with shear force and current feedback," Analytical Chemistry, 2002, 74, pp. 3634-3643.

Ludwig et al. "Topography Feedback Mechanism for the Scanning Electrochemical Microscope Based on Hydrodynamic Forces Between Tip and Sample," Review of Scientific Instruments, Apr. 1995, vol. 66, No. 4, pp. 2857-2860.

Macpherson et al. "Combined Scanning Electrochemical-Atomic Force Microscopy," Analytical Chemistry, 2000, 72, pp. 276-285.

McKelvey et al. "Intermittent Contact-Scanning Electrochemical Microscopy (IC-SECM): A New Approach for Tip Positioning and Simultaneous Imaging of Interfacial Topography and Activity," Analytical Chemistry, 82(15), Aug. 2010, pp. 6334-6337.

Proksch et al. "Imaging the Internal and External Pore Structure of Membranes in Fluid: Tapping Mode Scanning Ion Conductance Microscopy," Biophysical Journal, Oct. 1996, vol. 71(4), pp. 2155-2157.

Written Opinion on related PCT application (PCT/GB2011/050747) from International Searching Authority (EPO) dated Jul. 27, 2011.

International Preliminary Report on Patentability on related PCT application (PCT/GB2011/050747) from International Bureau of WIPO dated Oct. 26, 2012.

European Patent Office (EPO) Communication on European patent application No. 11716297.4 dated Jan. 24, 2017.

U.S. Appl. No. 15/473,362, filed Mar. 29, 2017, Patrick Unwin Kim Martin McKelvey, US 2018-0052187 A1, Office Action dated Mar. 8, 2019 Final Office Action dated Dec. 9, 2019.

* cited by examiner

SCANNING ELECTROCHEMICAL MICROSCOPY WITH OSCILLATING PROBE TIP

CROSS-REFERENCE TO RELATED APPLICATIONS

The present application is a continuation of U.S. patent application Ser. No. 15/473,362, filed Mar. 29, 2017, which is a continuation of U.S. patent application Ser. No. 15/069,815, filed Mar. 14, 2016, which is a continuation of U.S. patent application Ser. No. 14/504,357, filed Oct. 1, 2014, which is a continuation of U.S. patent application Ser. No. 13/641,360, filed Oct. 15, 2012, which is a national phase filing, under 35 U.S.C. § 371(c), of International Application No. PCT/GB2011/050747, filed Apr. 14, 2011, the disclosures of which are incorporated herein by reference in their entirety.

FIELD OF THE INVENTION

This invention relates to scanning microscopy.

BACKGROUND TO THE INVENTION

Scanning electrochemical microscopy (SECM) is a scanned probe microscopy technique in which the electrochemical response of a SECM tip (typically an ultramicroelectrode (UME) with an active part of less than 25 µm) is used to provide information on the properties (e.g. topography or chemical activity) of a surface of interest (an interface, surface or phase) or for modification of a surface of interest (an interface, surface or phase). The SECM tip is immersed in a solution and used to detect chemical species (molecules or ions) which interact with the SECM tip or to generate chemical species (molecules or ions). Because the SECM tip detects or generates concentrations and fluxes of a chemical species locally, it provides information on the properties of an interface, surface or phase at high spatial resolution. The SECM tip can be operated in amperometric, potentiometric or conductivity modes, amongst other possibilities. A wide variety of SECM tips have been described including solid metal electrodes, semiconducting electrodes and liquid/liquid probes.

Conventional amperometric SECM (which forms the majority of applications) typically operates in direct current (DC)-constant height (CH) mode in which the tip, usually held at a potential to detect or electrolyze an analyte at a diffusion-limited rate, is positioned above the interface of interest. The tip response, recorded as a function of the tip position, provides a current image which depends on both the sample topography (distance between the tip and the interface) and surface activity.

Despite the tremendous impact of SECM in interfacial science, a significant—and generally unresolved—challenge concerns absolute tip positioning. There is a need for methods which allow the topography (distance between the tip and the interface) and surface flux (or activity) information to be determined simultaneously and unambiguously.

Several methods have been proposed in the prior art to address this general issue, including:

the use of two electroactive mediators in the solution; one which maps the topography alone and the other the activity; (see "Scanning electrochemical microscopy as a local probe of oxygen permeability in cartilage." Gonsalves, Marylou, Anna L. Barker, Julie V. Macpherson, Patrick R. Unwin, Danny O'Hare, and C. Peter Winlove, *Biophysical Journal*, 2000, 78(3), pp 1578-1588 the use of impedance based methods for tip positioning and feedback; (see "Impedance Feedback Control for Scanning Electrochemical Microscopy" Mario A. Alpuche-Aviles and David O. Wipf, *Anal. Chem.*, 2001, 73(20), pp 4873-4881)

the use of tip position modulation (TPM) to detect the substrate surface and control the positioning of the SECM tip; (see U.S. Pat. No. 5,382,336) the use of shear force methods for tip positioning and feedback; (see "Topography feedback mechanism for the scanning electrochemical microscope based on hydrodynamic forces between tip and sample", Markus Ludwig, Christine Kranz, Wolfgang Schuhmann, and Hermann E. Gaub, Review of Scientific Instruments, 1995, 66, pp 2857-2860 and "Combined scanning electrochemical/optical microscopy with shear force and current feedback", Youngmi Lee, Zhifeng Ding, and Allen J. Bard, *Anal. Chem.*, 2002, 74, pp 3634-3643. and the integration of a UME into atomic force microscopy tips (SECM-AFM). (see "Combined Scanning Electrochemical—Atomic Force Microscopy" J. V. Macpherson and P. R. Unwin, *Anal. Chem.*, 2000, 72, 276-285, available at the time of writing at http://dx.doi.org/10.1021/ac990921w)

However, it can be difficult to find appropriate redox-active species that do not interact with the underlying system of interest when using two mediators.

Also, the impedance feedback and TPM methods depend on the measured current to determine the distance from the SECM tip to the substrate surface and thus are dependent on the activity of underlying substrate.

The shear force feedback and SECM-AFM methods are attractive as they utilize a force feedback signal to allow a close (and more or less constant) separation to be maintained between the tip and interface of interest during imaging, but they require additional specialist instrumentation and/or non-conventional tips.

SUMMARY OF THE INVENTION

A first aspect of the invention provides a method comprising:
  oscillating a scanning microscopy probe tip relative to a surface of interest;
  detecting damping of an amplitude of the oscillation of the probe tip resulting from the probe tip coming into contact with the surface of interest;
  using the detected damping to detect the surface of interest; and
  using the probe tip to measure or modify activity of the surface of interest simultaneously with detecting damping.

The invention also provides a computer program comprising machine readable instructions that when executed by scanning electrochemical microscopy apparatus control it to perform the method A second aspect of the invention provides a computer readable medium having stored thereon machine readable code that when executed by a processor of a scanning microscopy apparatus cause the apparatus to perform a method comprising:

oscillating an probe tip relative to a surface of interest;

detecting damping of an amplitude of the oscillation of the probe tip resulting from the probe tip coming into contact with the surface of interest;

using the detected damping to detect the surface of interest; and using the probe tip to measure or modify activity of the surface of interest simultaneously with detecting damping.

A third aspect of the invention provides apparatus configured:

to oscillate a scanning microscopy probe tip relative to a surface of interest;

to detect damping of an amplitude of the oscillation of the probe tip resulting from the probe tip coming into contact with the surface of interest;

to use the detected damping to detect the surface of interest; and to use the probe tip to measure or modify activity of the surface of interest simultaneously with detecting damping.

A fourth aspect of the invention provides apparatus comprising:

means for oscillating a scanning microscopy probe tip relative to a surface of interest;

means for detecting damping of an amplitude of the oscillation of the probe tip resulting from the probe tip coming into contact with the surface of interest;

means for using the detected damping to detect the surface of interest; and means for using the probe tip to measure or modify activity of the surface of interest simultaneously with detecting damping.

A general discussion of salient features of the embodiments and associated effects and advantages now follows.

The invention, some aspects of which are known as intermittent contact SECM (IC-SECM), is a new scanning microscopy, for instance SECM, tip positioning method that can allow topography and surface activity to be resolved independently.

Embodiments of the invention involve the application of an oscillatory perturbation to the SECM tip relative to the surface of interest. The height of the SECM tip oscillates about the average SECM tip height. The SECM tip is moved relative to the surface of interest and the amplitude of the oscillation becomes damped as the SECM tip encounters the surface. The damping is detected and provides absolute information on the SECM tip-surface separation. The damping of the oscillation amplitude is used as a feedback signal to control the movement of the SECM tip relative to the substrate surface. The electrochemical response of the SECM tip can be either measured to provide complementary information about the interface, surface or phase or controlled to provide modification of the interface, surface or phase. Aspects of the invention can be employed with all SECM tip types (including amperometric and potentiometric) and in all SECM configurations. Aspects of the invention can also be employed with nanoscale SECM electrode tips and SECM tips which have been shaped by focused ion beam methods or polishing and etching procedures.

Aspects of the invention can also be used for positioning and imaging with ion conductance probes and fibre optic probes, and other probes that it may be desired to position physically near a surface or interface, such as probes for local gas detection/imaging; positioning microfluidic cells etc. The SECM tip may be a potentiometric indicator probe.

Compared to existing techniques, embodiments of this invention provide an inexpensive, robust and simple method to independently resolve substrate topography and surface activity. Minimal additional equipment and control schemes are needed to implement certain embodiments of the invention. Thus, aspects of the invention provide an inexpensive and simple method to resolve substrate topography and substrate activity in SECM. The feedback (used to locate the surface) depends on the physical interaction of the SECM tip with the substrate surface and does not depend on the surface activity. This means that changes in substrate activity do not affect the tip-substrate distance measurements, and thus embodiments of the invention provide a robust method to determine substrate topography and substrate activity independently. This also means that aspects of the invention can be used with standard SECM tips (UMEs) and in standard SECM modes. Aspects of the invention can be used also in non-electrochemical microscopy.

A particularly attractive feature of this approach is that it would allow other types of SECM tips, such as potentiometric electrodes and ion conductance probes, to be deployed. Also because the tip position is oscillated slightly, one can additionally isolate the ac component of the current as well as the mean current, greatly enhancing the electrochemical information content.

Embodiments of this invention differ from Tapping Mode AFM (TM-AFM) (U.S. Pat. No. 5,412,890) in that the embodiments use a completely different tip design (as compared to the cantilever construction tips used in TM-AFM), and the tip is oscillated at different frequencies (as compared to resonance frequencies used in TM-AFM).

This invention differs from the tip position modulation (TPM) method of Wipf and Bard (U.S. Pat. No. 5,382,336) in that a non-electrochemical signal is used to provide the feedback and positioning sensitivity. Unlike TPM, the SECM tip comes into contact with the substrate with this invention.

BRIEF DESCRIPTION OF THE DRAWINGS

Embodiments of the invention will now be described, by way of example only, with reference to the accompanying drawings in which.

DETAILED DESCRIPTION

Embodiments of the invention involve the application of an oscillatory perturbation of typically 0.1 nm to 1 µm at typically 5 to 100 000 Hz to a SECM tip. The SECM tip may be a UME, for instance in the form of a metal wire A, with a radius of 0.002 to 12.5 µm, sealed in a glass capillary B relative, typically normal, to a surface of interest C. With this oscillation the amplitude of the oscillation becomes damped as the tip encounters the surface. The oscillation is typically sinusoidal, though other oscillation types can be used.

Figure 1:
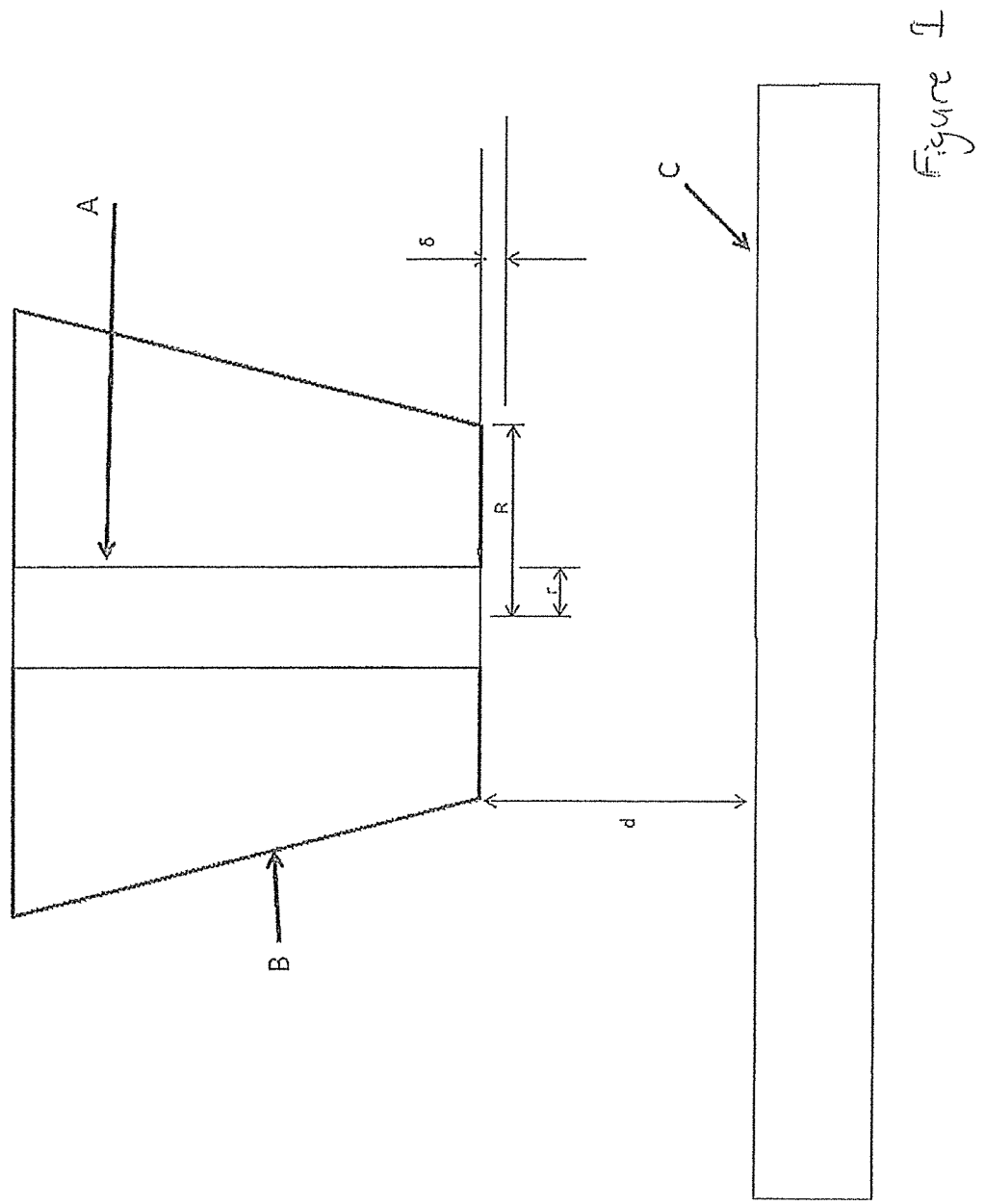
FIG. 1 shows a UME and a substrate surface as used with embodiments of the present invention.
Figure 3:
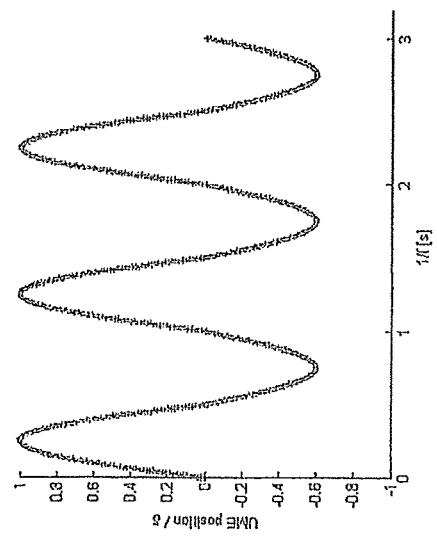
FIGS. 2 and 3 show movement of SECM tips according to embodiments of the invention.
Figure 2:
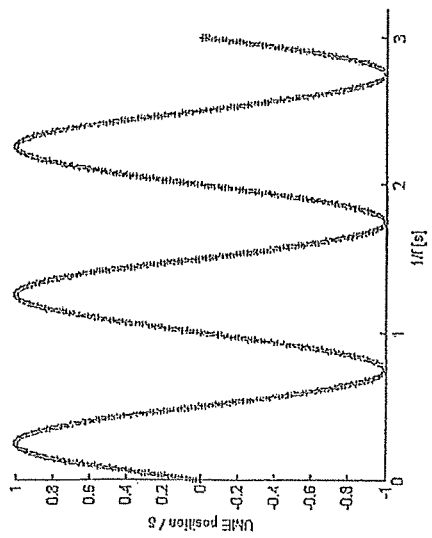

FIG. 1 shows a cross section of an UME and the oscillation of the UME. FIG. 2 shows the movement of the SECM tip when in bulk solution (i.e. not in contact with the surface). FIG. 3 shows the movement of the SECM tip when in intermittent contact with the substrate surface. Here, it can be seen that the uppermost half of the waveform, i.e. the parts above position 0, are substantially the same as for FIG. 2, however the lowermost half of the waveform is damped by contact with the surface C. The damping is detected and provides absolute information on the tip-surface separation. This can be used as a measure of tip-surface separation for approach curve measurements (where the tip is translated towards or away from the substrate, usually in a perpendicular direction) and as a set point to maintain a fixed distance between the tip and substrate surface during imaging (where the tip and/or the substrate are moved laterally with respect to each other). The SECM tip electrochemical signal (e.g. current and/or potential) is measured throughout and provides information about the surface activity.

Figure 4:
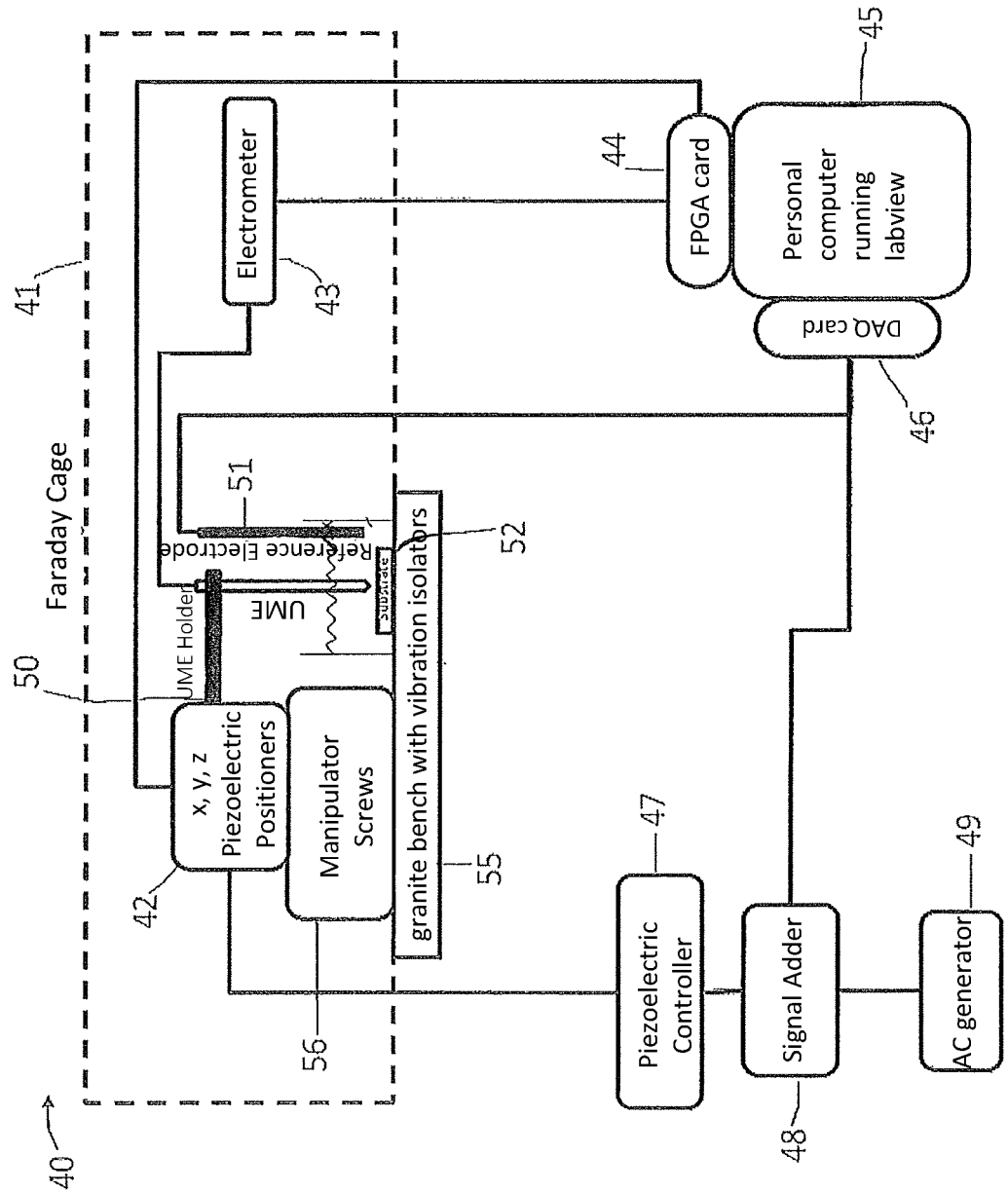
FIG. 4 shows an implementation of intermittent contact SECM embodying aspects of the invention.

A detailed description of an implementation of the invention is now given. Embodiments of the invention are described with amperometric approach curve measurements and amperometric and potentiometric imaging. The amperometric configuration for an electrically unbiased sample is shown schematically in FIG. 4. Note that if the sample is a conductor of semiconducting material, it can also be connected up as an electrode (potential and/or current control).

Apparatus and Instrumentation

Coarse control of the SECM tip B (a Pt disk UME), which is typically mounted perpendicular to the substrate surface 52 but can be mounted at different angles, is realized by a three-dimensional manual x,y,z stage controlled by manipulator screws 56. Note that other means of achieving this positioning are also possible. Fine control is realized by three (x, y, z) piezoelectric positioners 42 fitted with strain gauge sensors. The piezoelectric positioners 42, operated in closed loop, are controlled by an amplifier/servo 47. The piezoelectric positioner amplifier/servo is controlled by a personal computer 45. An ac signal provided by an AC generator 49 is added to the z piezoelectric positioner control by a signal adder 48. The ac signal creates a sinusoidal oscillation of:

$$\delta*\sin(2\pi*f*t)$$

in the height of the SECM tip B about the average tip height, but other oscillation profiles can be used.

The computer 45 includes processing means, comprising one or more processors, memory means, comprising one or more memories, and a computer program stored in the memory means. The processing means, under control of the computer program, performs various actions that are described below, including measuring, detecting and controlling operations.

Embodiments of the invention are typically implemented in a Faraday cage 41 on a vibration isolation table 55 in a two electrode arrangement with the metal wire A or UME tip B as the working or active electrode and a quasi-reference electrode 51. However, a three electrode (working, reference and counter electrodes) or a four electrode bipotentiostatic setup can be used, among other well known electrochemical setups.

The SECM tip current and the location of the piezoelectric positioners are recorded. The SECM is operated in a diffusion-limited configuration; with the SECM tip held at a potential to electrolyse a target chemical.

Intermittent contact SECM (IC-SECM) Approach Curves

The SECM tip is moved close to the substrate surface using the manipulator screws 56. Approach curve measurements are carried out by translating the SECM tip towards the substrate using the z one of the x,y,z piezoelectric positioners 42. Simultaneously the SECM tip is typically oscillated at a frequency of 70 Hz with a magnitude of 1-2% (10 nm-150 nm) of the active electrode radius. The oscillation magnitude may, however, take any value between 0.001% and 50% of the active electrode radius. The IC-SECM approach curve is terminated when intermittent contact is detected. Intermittent contact here is defined as a sustained decrease in the z piezoelectric positioner strain gauge sensor (z-SGS) tip oscillation amplitude as compared to the z-SGS oscillation amplitude in the bulk solution (for example a 1 to 15% sustained decrease).

As the UME tip B approaches a surface C the mean current decreases if the surface C is an insulating substrate. When approached to a surface C the mean current increases if the surface C is a conducting substrate. The magnitude of the z-SGS oscillation remains constant for most of the approach curve, only changing when intermittent contact is made between the UME tip B and the substrate surface C.

Although the oscillation frequency here is 70 Hz, it may take any value between 5 and 100 000 Hz. The oscillation frequency may be between 5 and 5000 Hz. The oscillation frequency may be between 30 and 110 Hz.

The oscillation amplitude may between 0.1 nm and 1 µm. The oscillation amplitude may be between 5 nm and 500 nm. The oscillation amplitude may be between 15 nm and 250 nm.

The oscillation amplitude of the SECM tip is monitored, and the measured oscillation amplitude is used to control the SECM tip movement relative to the surface of interest.

Instead of a sinusoidal oscillation, it may take some other form. For instance, a square oscillation may be applied to the SECM tip. The oscillation frequency of the square wave may be between 5 and 100 000 Hz, or may take some other value. The oscillation amplitude may be between 0.1 nm and 1 µm.

A sawtooth oscillation may be applied to the SECM tip. The oscillation frequency of the sawtooth signal may be between 5 and 100 000 Hz. Here, the oscillation amplitude may be between 0.1 nm and 1 µm.

The electrochemical response of the SECM tip is measured to provide information about the surface of interest. The electrochemical response of the SECM tip may be the current generated at, or flowing through, the SECM tip when held at a potential to interact with a species of interest. Alternatively it may be the potential generated at the SECM tip when interacting with a species of interest. It may alternatively be the potential when a current is applied to the tip, via galvanostatic control. It may alternatively be a conductance current.

The electrochemical response of the SECM tip may be used to deliver chemical species to the surface of interest.

The surface of interest in these embodiments is an interface between two substances, a surface of a solid or liquid, or a boundary between two phases (i.e. solid and liquid, liquid and gas, or solid and gas) of a substance, although it could be another surface such as a surface of a living cell or tissue.

The SECM tip is oscillated normal, or substantially normal, to the surface of interest.

Intermittent Contact SECM Imaging

The SECM tip B is engaged to the surface C using an Intermittent Contact (IC)-SECM approach curve which halts when intermittent contact is detected. An image is constructed typically using a series of line scans, although other scan methods are possible. Each line scan consists of a forward intermittent contact scan and a reverse constant distance scan. The forward scan is done while maintaining intermittent contact with the substrate surface C. The reverse scan is done at a constant distance away from the substrate surface C, which is identified by the z measurements of the tip position B in the forward scan. This separation is typically in the range 0.1-2 µm for a 2 µm active radius tip B. During the intermittent contact scan the SECM tip height is updated by a proportional controller, implemented on the computer 45. Other forms of controller, for instance a PID (proportional-integral-derivative) controller, can be used instead.

The proportional controller takes the form:

$$z_{new} = z_{old} + P*(z^{SGSAmplitude} - 0.9*z^{SGSBulkAmplitude}),$$

where $z_{new}$ and $z_{old}$ are the new and old SECM tip height respectively, $z^{SGSAmplitude}$ is the z-SGS oscillation amplitude and $z^{SGSBulkAmplitude}$ is the z-SGS oscillation amplitude in the bulk solution.

A ten percent decrease in the z-SGS oscillation amplitude is used as a set point for scanning, although other values can be used. The SECM tip current is measured during the line scans. The images of chemical activity (from the various tip current measurements) and substrate height (from the location of the z piezoelectric positioner) are thus constructed simultaneously.

On a substrate with conducting and insulating regions, IC-SECM imaging, when the UME is operated in an amperometric feedback mode, produces an image with an increase in mean current over the conducting regions (positive diffusional feedback) and a decrease in mean current over the insulating regions (negative diffusional feedback). The mean current can be recorded during both the intermittent contact lines scans and the constant distance lines scans. The same pattern of increases and decreases in mean current is observed in both the intermittent contact and constant distance images. However the intermittent contact mean current shows a greater variability than the constant distance mean current. The substrate surface is identified by the computer 45 by the position of the z piezoelectric positioner during the intermittent contact lines scans. In addition, the oscillating component of the current can be isolated. The magnitude and phase of the oscillating component of the current is used by the computer 45 to construct images of the substrate surface activity.

IC-SECM imaging when operating an UME as a potentiometric tip (e.g. a pH-sensitive or Cl-selective electrode or similar) produces an image of the concentration of the species of interest. In this case a two-electrode potentiometric electrode set up is used (with indicator and reference electrodes) and the potential of the indicator electrode is measured. This can be converted to a local concentration of the species of interest at the location of the tip. As for amperometric imaging described above, a key advantage of this method is that the topography of the sample and the tip-substrate separation is determined from the damping of the tip oscillation. Potentiometric electrodes can also be deployed into the IC-SECM mode for approach curve measurements.

The invention claimed is:

1. A method comprising:
   oscillating, using a piezoelectric positioner fitted with a strain gauge sensor, a scanning microscopy ultramicroelectrode probe tip in height relative to a surface of interest;
   detecting damping of an amplitude of the oscillation of the probe tip by detecting by the strain gauge sensor a decrease in the amplitude of the oscillation of the probe tip as compared to an amplitude of oscillation of the probe tip in a bulk solution, the decrease in the amplitude of the oscillation of the probe tip indicating intermittent contact with the surface of interest;
   using the detected decrease in the amplitude to detect the surface of interest; and
   using the probe tip to measure or modify activity of the surface of interest simultaneously with detecting damping.

2. A method as claimed in claim 1, comprising detecting the decrease in the amplitude of the oscillation of the probe tip during an approach curve measurement.

3. A method as claimed in claim 2, comprising terminating the approach curve measurement when intermittent contact is detected.

4. A method as claimed in claim 2, comprising terminating the approach curve measurement on detecting a decrease in sensor tip oscillation amplitude as compared to oscillation amplitude in a reference medium.

5. A method as claimed in claim 2, comprising terminating the approach curve measurement on detecting a decrease of between 0.5% and 15% in sensor tip oscillation amplitude as compared to oscillation amplitude in a reference medium.

6. A method as claimed in claim 2, comprising terminating the approach curve measurement on detecting a decrease of about 5-10% in tip sensor oscillation amplitude as compared to oscillation amplitude in a reference medium.

7. A method as claimed in claim 1, further comprising constructing an image using a series of line scans, each line scan including a forward intermittent contact scan and a reverse constant distance scan.

8. A method according to claim 1, further comprising using a measured oscillation amplitude to control the probe tip movement relative to the surface of interest.

9. A method as claimed in claim 1, wherein oscillating the probe tip comprises oscillating the probe tip with a magnitude of between 1% and 2% of the radius of an active electrode of the probe tip.

10. A method according to claim 1, wherein the oscillation to the probe tip is selected from the group of:
    sinusoidal oscillation, sawtooth oscillation, and square oscillation.

11. A method according to claim 1, in which a frequency of oscillation is selected from the group:
    between 5 and 100,000 Hz, between 5 and 5,000 Hz, and between 30 and 110 Hz.

12. A method according to claim 1, in which an amplitude of oscillation is selected from the group:
    between 0.1 nm and 1 µm, between 5 nm and 500 nm, and between 15 nm and 250 nm.

13. A method according to claim 1, further comprising using a measured electrochemical response of the probe to provide information about the surface of interest.

14. A method according to claim 13, in which the electrochemical response of the probe tip is the current generated at the probe tip when held at a potential to interact with a species of interest.

15. A method according to claim 13, in which the electrochemical response of the probe tip is the potential generated at the probe tip when interacting with a species of interest.

16. A method according to claim 13, comprising using the electrochemical response of the probe tip to deliver chemical species to the surface of interest.

17. A method as claimed in claim 1, wherein oscillating of the probe tip is normal or generally normal to the surface of interest.

18. A non-transitory computer readable medium having stored thereon machine readable code that when executed by a processor of a scanning microscopy apparatus cause the apparatus to perform a method comprising:

oscillating an ultramicroelectrode probe tip in height relative to a surface of interest using a piezoelectric positioner fitted with a strain gauge sensor;

detecting damping of an amplitude of the oscillation of the probe tip by detecting by the strain gauge sensor a decrease in the amplitude of the oscillation of the probe tip as compared to an amplitude of oscillation of the probe tip in a bulk solution, the decrease in the amplitude of the oscillation of the probe tip indicating intermittent contact with the surface of interest;

using the detected damping to detect the surface of interest; and using the probe tip to measure or modify activity of the surface of interest simultaneously with detecting damping.

19. Apparatus configured:

to oscillate a scanning microscopy ultramicroelectrode probe tip in height relative to a surface of interest using a piezoelectric positioner fitted with a strain gauge sensor;

to detect damping of an amplitude of the oscillation of the probe tip by detecting by the strain gauge sensor a decrease in the amplitude of the oscillation of the probe tip as compared to an amplitude of oscillation of the probe tip in a bulk solution, the decrease in the amplitude of the oscillation of the probe tip indicating intermittent contact with the surface of interest;

to use the detected damping to detect the surface of interest; and to use the probe tip to measure or modify activity of the surface of interest simultaneously with detecting damping.

\* \* \* \* \*